Patented Dec. 12, 1944

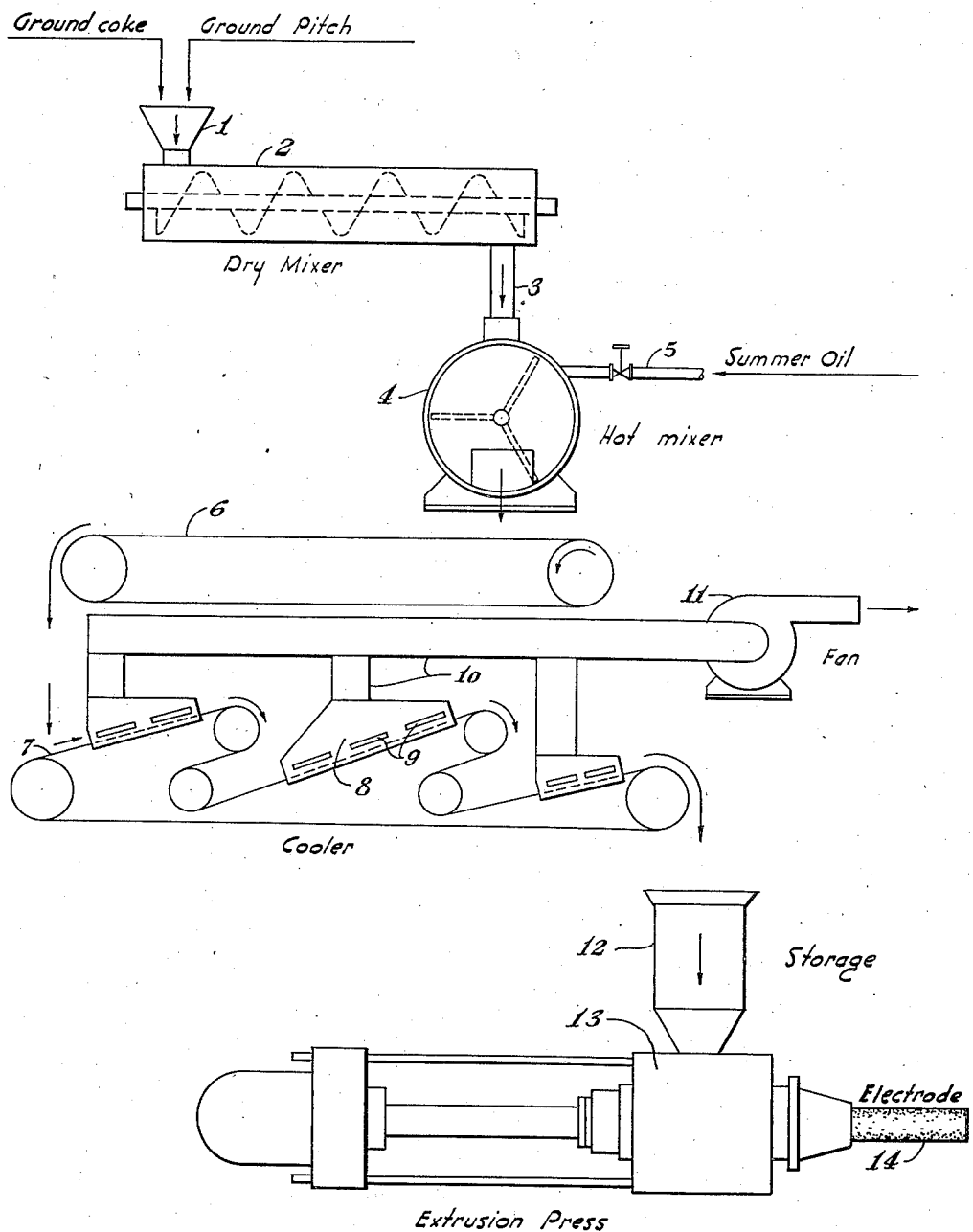

2,365,055

UNITED STATES PATENT OFFICE 2,365,055

PREPARATION OF SHAPED CARBON ARTICLES

Edward R. Cole, Midland, Mich., assignor to The Dow Chemical Company, Midland, Mich., a corporation of Michigan Application February 3, 1941, Serial No. 377,162

8 Claims. (Cl. 18—54.7)

This invention relates to a method of preparing shaped carbon articles, particularly carbon electrodes for electrolytic and electrothermal purposes.

In the manufacture of shaped carbon articles it is customary practice first to form a plastic mixture of a carbon aggregate, such as ground petroleum coke, and a binder, usually pitch, by charging the aggregate and lumps of pitch into a heated mixer maintained at a temperature above the softening point of the pitch, and subjecting the charge to an intense mixing action. The resulting plastic mass is then cooled to a temperature near but somewhat above the congealing temperature of the pitch, and is shaped to the desired form by molding it or extruding it while at such temperature. The shaped articles are then further cooled to set the binder. These products, commonly termed "green carbons," are usually baked at an elevated temperature in the absence of air to remove volatile impurities, thus forming amorphous carbon objects. If desired, these latter may be further heated at extreme temperatures to convert the carbon to graphite.

In the process described, as ordinarily carried out, there is obtained an undesirably high proportion of green carbons which contain flaws, and must be scrapped. These flaws are attributable in part to incomplete mixing of the raw materials, with consequent occurrence of inhomogeneities, and in greater part to an inadequate method of cooling the hot plastic mixture prior to molding or extrusion, resulting in spits, cones, cross-cracks, etc. The prevention of such imperfections has long occupied the attention of the art, but heretofore no effective method of minimizing them has been available. It is an object of the present invention to provide such a method.

The invention is based in part on the discovery that when the hot mixing operation used in prior processes is carried out as before, but is preceded by an intimae mixing of the carbon aggregate and the pitch binder in ground form at a temperature below the softening temperature of the pitch, the final plastic mixture resulting from the two mixing operations is much more uniform than that prepared by hot mixing alone, even when the latter is carried out for unreasonably long periods. Inhomogeneities and hard spots are avoided. In addition, carbon articles prepared from the mixture formed in the new manner are of higher density and lower restivity than those produced by prior methods, and require much less time to bake to amorphous carbon.

The present invention also depends in part for its success upon a fuller appreciation of certain of the physical properties of the coal-tar pitch binder commonly used in making carbon articles.

Thus, it has been found that two surfaces of pitch, when pressed together, will adhere to one another tenaciously only when the pitch is at a temperature within an extremely narrow range, which for present purposes will be termed the "critical adhesion range." This range, which can be determined experimentally for any pitch, usually covers only a few degrees centigrade, and lies at a temperature just slightly above the melting point of the pitch. At temperatures above this range the pitch is too fluid to stick together well, while at temperatures below the range, surfaces of the pitch do not adhere to one another at all strongly, but pull apart with the application of only slight force. It is evident, then, that in preparing shaped carbon objects, the plastic mixture, consisting of particles of aggregate coated with pitch binder, should be shaped into articles while the mixture is at a temperature within the critical adhesion range of the pitch. Unless this is done, the shaped article will be of low strength since the internal adhesive forces between pitch-coated particles of aggregate will be weak. The art has recognized vaguely the existence of this critical adhesion range, and has, of course, always sought to carry out forming operations at such a temperature that objects of maximum strength are obtained.

However, the art has apparently never appreciated the existence of a second and more important characteristic of the pitch. That is, when particles of hot pitch have once been cooled to a temperature below the critical adhesion range and hence will not adhere strongly to one another, their lost adhesiveness cannot be restored merely by heating the particles back into the critical adhesion range. Particles thus reheated will not adhere, the adhesiveness being restored only by heating the pitch to a temperature at which it is freely fluid, and then cooling again into the critical adhesion range. With this discovery in mind, then, it will be understood that in making shaped carbon articles, if, in cooling the hot mixture of aggregate and pitch into the critical adhesion range prior to shaping it, any portion of the mixture is allowed to cool below that range, such portion will have lost its adhesiveness, even though its temperature subsequently returns into the critical range, as by contact with the remainder of the mixture. This relatively non-adheive portion will then appear in the final shaped article as a weak spot, usually as a split or crack. In the present process, such flaws are avoided by preventing the temperature of any portion of the mixture from falling below the critical adhesion range while the entire mixture is being cooled into that range, as will be described in detail.

It has also been found that the adhesive characteristics of the particles of the carbon aggregate-pitch mixture are largely destroyed if the mixture is subjected to any substantial shearing force after it has been mixed and while it is being cooled into the critical adhesion range. At the temperature of hot mixing, and likewise after the mixture has been cooled into the critical range, mechanical working is not detrimental. However, at the intermediate temperatures in the cooling operation, shearing forces, such as those produced by working or tooling the mixture, tend to smear the pitch-coated particles of aggregate together, forming smooth relatively non-adhesive surfaces which eventually appear as planes of weakness in the final shaped article. In the present process, these flaws are prevented by avoiding subjecting the plastic mixture to any substantial shearing force during cooling, as by preventing moving frictional contact with any supporting surface until the critical adhesion temperature is reached.

In practice, in preparing shaped carbon articles, such as green carbon electrodes, by the process of the invention, the carbon aggregate, e. g. calcined petroleum coke, coal, coke, retort carbon, graphite, green scrap or mixtures thereof, and the coal-tar pitch binder are separately ground to the desired degree of fineness and size distribution. The aggregate and a smaller quantity of ground binder are then charged into a mixing machine at a temperature well below the softening temperature of the pitch, usually at room temperature, and are subjected to an intense mixing action for a time sufficient to form an intimate admixture of the two solid materials. This dry mixture is then heated to a temperature at which the pitch is freely fluid and is subjected to further hot mixing or mechanical working so as to cause the binder to coat the particles of carbon aggregate and form a plastic mass. This mass is then cooled to a temperature within the critical adhesion range of the pitch (as previously determined experimentally, and being, for example, about 105° to 110° C. for a 100° C. melting point pitch) while preventing the temperature of any portion of the mass from falling appreciably below such range at any time during the cooling. The cooled mass is then shaped into articles of predetermined form by molding or extrusion while still at a temperature within the critical range, and the articles thus formed are further cooled to set the binder.

It will be understood that the two mixing operations in the process of the invention may, if desired, be carried out in a single piece of apparatus simply by raising the temperature after the "dry" mixing is completed. However, the mechanism of mixing two granular solids in the first step is very different from that of coating a solid with a plastic binder in the second step, so that it is desirable to carry out the process in two separate zones. The preliminary mixing is usually effected in any of a variety of dry or powder mixers, while the second mixing at higher temperatures, which is rather more of a mechanical working or kneading operation, is preferably accomplished in a paddle mixer.

In the preparation of extruded articles, such as electrodes, it is desirable to incorporate a small proportion of summer oil or other mineral oil into the plastic extrusion mass to serve as a lubricant during extrusion. The oil is preferably added by injecting it into the plastic mass while the latter is being hot mixed. This method of introduction gives a much more uniform product than that obtained by prior methods.

As already explained, the operation of cooling the plastic mixture formed in the hot mixer to a temperature within the critical adhesion range is carried out in such manner as to prevent the temperature of any portion of the mixture from falling appreciably below such range while at the same time avoiding subjecting the mass to any substantial shearing force. This step is preferably effected by supporting the hot mixture on a surface having a low thermal conductivity, such as insulating board or rubberized fabric, and passing cool air over the mass while repeatedly turning the mass to expose fresh surfaces thereof without subjecting it to any substantial moving frictional contact with any supporting surface. During the cooling it is desirable to avoid bringing the plastic mass into contact with any ferrous metal surface, since it tends to stick tightly thereto. Metal parts in contact with the mass are conveniently formed of Monel metal, brass, bronze, or a magnesium-base alloy.

The process of the invention may be further explained with reference to the accompanying drawing, which illustrates diagrammatically the flow of materials in a preferred form of the process.

As shown in the drawing, ground pitch binder and a larger proportion of an aggregate consisting of ground calcined petroleum coke are charged into the hopper 1 of a dry mixer 2 which is at room temperature. In the mixer, the two ingredients are agitated together, forming an intimate mixture which eventually works its way to the chute 3 through which it falls into a paddle mixer 4 maintained at a temperature at which the pitch is freely fluid. (In the case of a pitch having a softening point of about 100° C. the hot mixer is operated at about 160° C.). In the mixer 4 the carbon aggregate is subjected to mechanical working and is thoroughly coated with pitch, forming a plastic mass. If desired, a small proportion of summer oil may be injected into the hot mixer through the valved line 5 while the mixer is running. By this procedure the summer oil is added in a relatively small continuous stream as the mixture is being formed, thereby assuring uniformity of distribution throughout the mixture and the avoidance of large concentrations of oil at any time during the mixing. The hot plastic mass formed in the mixer 4 is then cooled by scraping it onto a moving endless belt 6 constructed of rubber, rubberized fabric, leather, or other material which does not have a high thermal conductivity. The plastic mass is not chilled by contact with such a belt, and no portion of the mixture falls to a temperature below the critical adhesion range. The progression of the belt 6 drops the plastic mass onto a second moving endless belt 7 of like material arranged over pulleys in such manner as to cause the mass to roll and fall downward at several points along its path. In this way the mass is turned repeatedly to expose fresh surfaces without subjecting it to any substantial moving frictional contact with any supporting surface. During the travel of the mixture with the belt 7, cool air is sucked over the surface of the mass by means of hoods 8 having slits 9 therein, and connected by ducts 10 to an exhaust fan 11, effectively and uniformly cooling the hot material. Leaving the endless belt 7, the plastic mass, cooled to a temperature within the critical adhesion range of the pitch, falls into a thermally insulated storage bin 12 from which it drops into an extrusion press 13 and is there formed into "green"

electrodes 14. The rate of cooling the hot plastic mass and its resulting temperature are easily controlled by adjusting the rate of travel of the belt 7 and the suction of the fan 11.

This application is a continuation-in-part of my copending application Serial No. 329,205, filed April 12, 1940.

I claim:

1. In a process for the preparation of shaped carbon articles, the steps which comprise: mixing together a carbon aggregate and pitch at a temperature at which the pitch is freely fluid; cooling the plastic mass to a temperature within its critical adhesion range while preventing the temperature of any portion of the mass from falling appreciably below such range at any time during the cooling; shaping the mass into articles of predetermined form while still at a temperature within the said adhesion range; and further cooling the shaped articles to set the pitch.

2. In a process for the preparation of shaped carbon articles, the steps which comprise: mixing together a carbon aggregate and pitch at a temperature at which the pitch is freely fluid; cooling the plastic mass to a temperature within its critical adhesion range while preventing the temperature of any portion of the mass from falling appreciably below such range at any time during the cooling, and while avoiding subjecting the mass to any substantial shearing force until the said adhesion temperature is reached; shaping the mass into articles of predetermined form while still at a temperature within the said adhesion range; and further cooling the shaped articles to set the pitch.

3. In a process for the preparation of carbon electrodes, the steps which comprise: mixing together calcined petroleum coke and coal-tar pitch at a temperature at which the pitch is freely fluid; cooling the resulting plastic mass to a temperature within its crictical adhesion range while preventing the temperature of any portion of the mass from falling appreciably below such range at any time during the cooling and while avoiding subjecting the mass to any substantial shearing force until the said adhesion range is reached; shaping the mass into electrodes by extruding it while still at a temperature within the said adhesion range; and further cooling the extruded electrode to set the pitch binder.

4. In a process for the preparation of shaped carbon articles, the steps which comprise: intimately mixing a carbon aggregate and ground pitch binder at a temperature below the softening temperature of the pitch; heating the mixture thus obtained to a temperature at which the pitch is freely fluid and working the mixture mechanically to produce a plastic mass; cooling the resulting mass to a temperature within its critical adhesion range while preventing the temperature of any portion of the mass from falling appreciably below such range at any time during the cooling and while preventing subjection of the mass to any substantial shearing force until the said adhesion range is reached; shaping the mass into articles while still at a temperature within the said adhesion range; and further cooling the shaped articles to set the binder.

5. In a process for the preparation of shaped carbon articles, the steps which comprise: intimately mixing a carbon aggregate and ground pitch binder at a temperature below the softening temperature of the pitch; heating the mixture thus obtained to a temperature at which the pitch is freely fluid and working the mixture mechanically to produce a plastic mass, and injecting summer oil into the mass while it is being mixed; cooling the plastic mass to a temperature within its critical adhesion range while preventing the temperature of any portion of the mass from falling appreciably below such range at any time during the cooling, while avoiding subjecting the mass to any substantial shearing force until said adhesion temperature is reached, and without bringing the mass into contact with any ferrous metal surface during the cooling; shaping the mass into articles of predetermined form while still at a temperature within the said adhesion range; and further cooling the shaped articles to set the binder.

6. In a process for the preparation of shaped carbon articles, the steps which comprise: intimately mixing a carbon aggregate and ground pitch binder at a temperature below the softening temperature of the pitch; heating the mixture thus obtained to a temperature at which the pitch is freely fluid and working the mixture mechanically to produce a plastic mass; cooling the plastic mass to a temperature within its critical adhesion range by supporting the mass on a surface having a low thermal conductivity and passing cool air over the mass while repeatedly turning the same to expose fresh surfaces thereof without subjecting it to any substantial shearing force; shaping the mass into articles of predetermined form while still at a temperature within the said adhesion range; and further cooling the shaped articles to set the binder.

7. In a process for the preparation of shaped carbon articles wherein a mixture of carbon aggregate and pitch is formed at a temperature at which the pitch is freely fluid and is then cooled to a temperature within its critical adhesion range and is shaped into articles at that temperature, the improvement in the cooling operation which comprises preventing any portion of the plastic mass from falling to a temperature below its critical adhesion range at any time during the cooling and preventing subjection of the mass to any substantial shearing force during said operation.

8. In a process for the preparation of shaped carbon articles wherein a mixture of the carbon aggregate and pitch is formed at a temperature at which the pitch is freely fluid and is then cooled to a temperature within its critical adhesion range and is shaped into articles at that temperature, the improved method of cooling the plastic mass to its critical adhesion temperature which comprises supporting the mass on a surface having a low thermal conductivity and passing cool air over the mass while repeatedly turning the same to expose fresh surfaces thereof without subjecting it to any substantial shearing force.

EDWARD R. COLE.